(12) United States Patent
Belkaid et al.

(10) Patent No.: US 11,752,835 B2
(45) Date of Patent: Sep. 12, 2023

(54) OPERATING METHOD FOR AN ELECTRIC HEATER

(71) Applicant: Mahle International GmbH, Stuttgart (DE)

(72) Inventors: Najim Belkaid, Mulhouse (FR); Guillaume Daudon, La Bourgonce (FR); Jean-Francois Walter, Turckheim (FR)

(73) Assignee: Mahle International GmbH ( * ) Notice: Subject to any disclaimer, the term of this patent is extended or adjusted under 35 U.S.C. 154(b) by 844 days.

(21) Appl. No.: 16/724,171

(22) Filed: Dec. 20, 2019

(65) Prior Publication Data

US 2020/0198441 A1  Jun. 25, 2020

(30) Foreign Application Priority Data

Dec. 21, 2018  (EP) .................................. 18215432

(51) Int. Cl.
*B60H 1/22* (2006.01)
*F24D 13/02* (2006.01)
*F24D 19/10* (2006.01)
*H05B 3/22* (2006.01)

(52) U.S. Cl.
CPC ......... *B60H 1/2227* (2019.05); *F24D 13/024* (2013.01); *F24D 19/1096* (2013.01); *H05B 3/22* (2013.01); *B60H 2001/2265* (2013.01)

(58) Field of Classification Search
CPC ...... B60H 1/2227; B60H 1/2218; B60H 1/03; B60H 2001/2265; B60H 2001/2231; B60H 2001/2256; F24D 13/024; F24D 19/1096; H05B 3/22; H05B 3/0014; H05B 2203/019; H05B 2203/02; H05B 2203/023; H05B 1/0236
See application file for complete search history.

(56) References Cited

U.S. PATENT DOCUMENTS

2019/0176574 A1  6/2019 Hofmann et al.

FOREIGN PATENT DOCUMENTS

| CN | 105307352 B | * | 9/2018 | |
| DE | 102016215549 A1 | | 2/2018 | |
| EP | 1361089 A2 | * | 11/2003 | ......... B60H 1/00742 |
| EP | 2 629 583 A1 | | 8/2013 | |
| EP | 2629583 A1 | * | 8/2013 | ........... H05B 1/0236 |

(Continued)

OTHER PUBLICATIONS

English abstract for KR-20130019085.

*Primary Examiner* — Emmanuel E Duke
(74) *Attorney, Agent, or Firm* — Fishman Stewart PLLC

(57) ABSTRACT

An operating method for an electric heater may include heating a fluid passing the electric heater to an outlet temperature by at least one heating element and operating the electric heater in one of a normal mode or a protection mode. In the normal mode, the at least one heating element may be supplied with at least one of a direct current and a direct voltage. In the protection mode, electrical power supplied to the at least one heating element may be regulated by pulse width modulation. The electric heater may be operated in the normal mode if a reference temperature is less than or equal to a critical temperature and in the protection mode if the reference temperature is greater than the critical temperature.

19 Claims, 1 Drawing Sheet

(56) References Cited

FOREIGN PATENT DOCUMENTS

| JP | 2009118729 A | * | 5/2009 | |
|---|---|---|---|---|
| KR | 20130019085 A | | 2/2013 | |
| KR | 20160108165 A | * | 9/2016 | ............. A61N 5/025 |
| WO | 20160019085 A1 | | 2/2016 | |
| WO | WO-2018033392 A1 | * | 2/2018 | ........... B60H 1/2218 |

* cited by examiner

OPERATING METHOD FOR AN ELECTRIC HEATER

CROSS-REFERENCE TO RELATED APPLICATIONS

This application claims priority to European Patent Application No. EP 18215432.8, filed on Dec. 21, 2018, the contents of which are hereby incorporated by reference in their entirety.

TECHNICAL FIELD

The present invention relates to an operating method for an electric heater and an electric heater which is formed and/or configured and/or programmed to perform the operating method.

BACKGROUND

In order to provide a comfortable air temperature for passengers in a vehicle, electric heaters are used in modern vehicles in HAVAC systems to heat fresh air which is supplied into a passenger cabin of the vehicle. In the case of vehicles with conventional combustion engines such electric heating devices or auxiliary heaters are used during the cold start phase in which the waste heat generated by the combustion engine is not sufficient to heat the fresh air to the desired temperature. In hybrid vehicles or fully electrically powered vehicles, the waste heat of the vehicle components is not sufficient to ensure a desired air temperature in the passenger cabin of the vehicle even after a starting phase.

Additionally, such electric heaters are used in battery cooling system in order regulated the temperature of a coolant and/or refrigerant used in such a battery cooling system.

In order to avoid malfunction of the electric heater which may result in damages of the electric heater or other components of the vehicle or passengers, the outlet air of the electric heater must not exceed a maximal temperature value which is fixed during the life cycle of the electric heater.

Such an electric heater is known from EP 2 629 583 A1 comprising at least N groups of heating elements which change their temperature by electrical power consumption, comprising a control unit with two switch arrangements such that the first switch arrangement includes at least N power switches for switching the at least N groups of heating elements to a high-voltage high side level and such that the second power switch arrangement includes at least N switches for switching the at least N groups of heating elements in a high-voltage low side level, wherein N is one, two or more.

The electric current flowing through the heating elements as well as the electric voltage across the heating elements is measured. The electric resistance of the heating elements is calculated by the micro controller and their temperature is evaluated based on the resistance data derived from the micro controller. Since the resistance of the heating elements is changing with the temperature, it is derivable from the resistance data. A power regulation will be carried out to achieve a desired temperature of the heating elements.

Thus, a regulation of heating element is provided by EP 2 629 583 A1, however, in order to control the outlet temperature of the electric heater, the electric heater requires at least one external temperature sensor which has to be installed in the outlet region of the electric heater. Additionally, the temperature values measured by such a temperature sensor have to be transmitted to the control unit. Since one temperature sensor is dedicated to one heating, several temperature sensors are required to cover the entire heater surface.

The present invention is based on the task of specifying an operating method for an electric heater providing a cost-effective operation of the electric heater.

SUMMARY

This problem is solved according to the invention by the subject matter of the independent claims. Advantageous embodiments are the subject matter of the dependent claims.

The present invention is based on the general concept that at least one temperature sensor of at least one control unit is used to measure a reference temperature of the heating element.

The innovative operating method for an electric heater is configured and/or formed for an electric heater with at least one control unit with at least one temperature sensor measuring a reference temperature. The temperature sensor may be integrated in the control unit. The temperature sensor may be integrated on a circuit board of the control unit and/or on a circuit board of the electric heater. The temperature sensor may be communicatively connected to the control unit. The temperature sensor may transfer measured temperature values to the control unit.

Additionally, the electric heater comprises at least one heating element having a PTC mode above a critical temperature and a NTC mode below the critical temperature. PTC elements serve as heating elements to convert electrical energy into heat energy. A PTC element is a temperature-dependent resistor with a positive temperature coefficient (PTC=Positive Temperature Coefficient) providing a non-linear correlation between electrical resistance and temperature of the PTC element. If a critical temperature is exceeded, the electrical resistance of the PTC element increases non-linearly with increasing temperature. However, such PTC elements have a negative temperature coefficient (NTC=Negative Temperature Coefficient) below the critical temperature. In the NTC mode, the electrical resistance of the PTC element increases with decreasing temperature.

The innovative operating method comprises the following steps. A fluid, in particular air, is passing the electric heater and heated to an outlet temperature by the heating element. The electric heater is operated either in a normal mode or in a protection mode. In the normal mode, the heating element is supplied with direct current and/or direct voltage. In the protection mode, the electrical power supplied to the heating element is regulated by pulse width modulation. The electric heater is operated in the normal mode if the reference temperature is less than or equal to the critical temperature. The electric heater is operated in the protection mode if the reference temperature is greater than the critical temperature.

In the state of the art it is known to derive the temperature of a heating element from its electric resistance, but this temperature value is not unambiguous as long as the operation mode of the heating element (PTC mode or NTC mode) is not determined. A protection mode must be triggered only when the heating element is operated in PTC mode while the protection mode is useless and/or counterproductive when the heating element is operated in NTC mode. The operation of the heating element in the normal mode improves the electromagnetic compatibility of the electric heater due to the reduced number of switching operations.

In an advantageous embodiment of the solution according to the invention, the critical temperature is stored in the control unit. The control unit compares the reference temperature with the critical temperature. If the reference temperature is less than or equal to the critical temperature, the control unit triggers the normal mode. If the reference temperature is greater than the critical temperature, the control unit triggers the protection mode.

In an advantageous embodiment of the solution according to the invention, the control unit determines the electrical resistance of the heating element while the electric heater is operated in the protection mode. The electrical resistance may be determined by measuring electric current flowing through the heating element as well as by measuring the electric voltage across the heating element. The electrical resistance may be determined by Ohm's law. The electric heater may comprise an electrical voltage measuring unit and/or electrical voltage measuring unit.

In an advantageous embodiment of the solution according to the invention, the control unit compares the electrical resistance of the heating element with a maximal electrical resistance value. If the electrical resistance is greater than the maximal electrical resistance value, the electrical power supplied to the heating element is reduced by pulse width modulation. This reduction may be performed by decreasing the duty cycle in order to reduce the current flowing through the heating element. The maximal electrical resistance value may correspond to a maximal outlet temperature of the electric heater. The correlation between electrical resistance of the heating element and the maximal outlet temperature of the electric heater may be determined by measurements and/or calculations and/or simulations. This correlation may be stored on the control unit in form of a transfer function and/or table.

In an advantageous embodiment of the solution according to the invention, the comparison of the electrical resistance of the heating element with the maximal electrical resistance value is performed continuously. The comparison as well as the adjustment of the electrical resistance of the heating element may be performed repetitive within equidistant time periods.

In an advantageous embodiment of the solution according to the invention, the control unit determines the outlet temperature of the fluid by means of the electrical resistance of the heating element. The correlation between electrical resistance of the heating element and the maximal outlet temperature of the electric heater may be determined by measurements and/or calculations and/or simulations. This correlation may be stored on the control unit in form of a transfer function and/or table.

In an advantageous embodiment of the solution according to the invention, a reference table and/or transfer function is stored in the control unit. For a given electrical resistance of the heating element, the reference table and/or transfer function provides a corresponding outlet temperature of the fluid. The control unit determines the outlet temperature of the fluid by means of the reference table and/or transfer function.

In an advantageous embodiment of the solution according to the invention, the control unit compares the outlet temperature with a maximal temperature value. If the outlet temperature is greater than the maximal temperature value, the electrical power supplied to the heating element is reduced by pulse width modulation.

This reduction may be performed by decreasing the duty cycle in order to reduce the current flowing through the heating element.

In an advantageous embodiment of the solution according to the invention, the comparison of the outlet temperature with a maximal temperature value is performed continuously. The comparison as well as the adjustment of the outlet temperature of the electrical heater may be performed repetitive within equidistant time periods.

The invention also relates to an electric heater comprising at least one control unit with at least on temperature sensor measuring a reference temperature. The electric heater comprises at least one heating element having a PTC mode above a critical temperature and a NTC mode below the critical temperature. The control unit is formed and/or configured and/or programmed to perform the method according to the invention described above.

In an advantageous embodiment of the solution according to the invention, the electric heater comprises at least one switching element. Such a switching element may be used to regulate the electrical power supplied to the heating element by pulse width modulation. In further embodiment of the solution, the switching element is controlled by the control unit.

In an advantageous embodiment of the solution according to the invention, the switching element is electrically conductively connected with the heating element and with at least one power source connection.

The electric heater may comprise at least N groups of heating elements which change their temperature by electrical power consumption, comprising a control unit with two switch arrangements such that the first switch arrangement includes at least N power switches for switching the at least N groups of heating elements to a high-voltage high side level and such that the second power switch arrangement includes at least N switches for switching the at least N groups of heating elements in a high-voltage low side level, wherein N is one, two or more.

The electric heater may include at least one first sensor arrangement for measuring the electric voltage across the heating elements and may include at least one second sensor arrangement for measuring the electric current flowing through the heating elements.

Further important features and advantages of the invention emerge from the de-pendent claims, from the drawings and from the associated description of the figures with reference to the drawings.

It goes without saying that the features mentioned above and those which have yet to be explained below can be used not only in the respectively stated combination, but also in different combinations or on their own without departing from the scope of the present invention.

Preferred exemplary embodiments of the invention are illustrated in the drawings and are explained in more detail in the description below, wherein the same reference signs refer to identical or similar or functionally identical components.

BRIEF DESCRIPTION OF THE DRAWINGS

In the drawings, in each case schematically.

DETAILED DESCRIPTION

Figure 1:
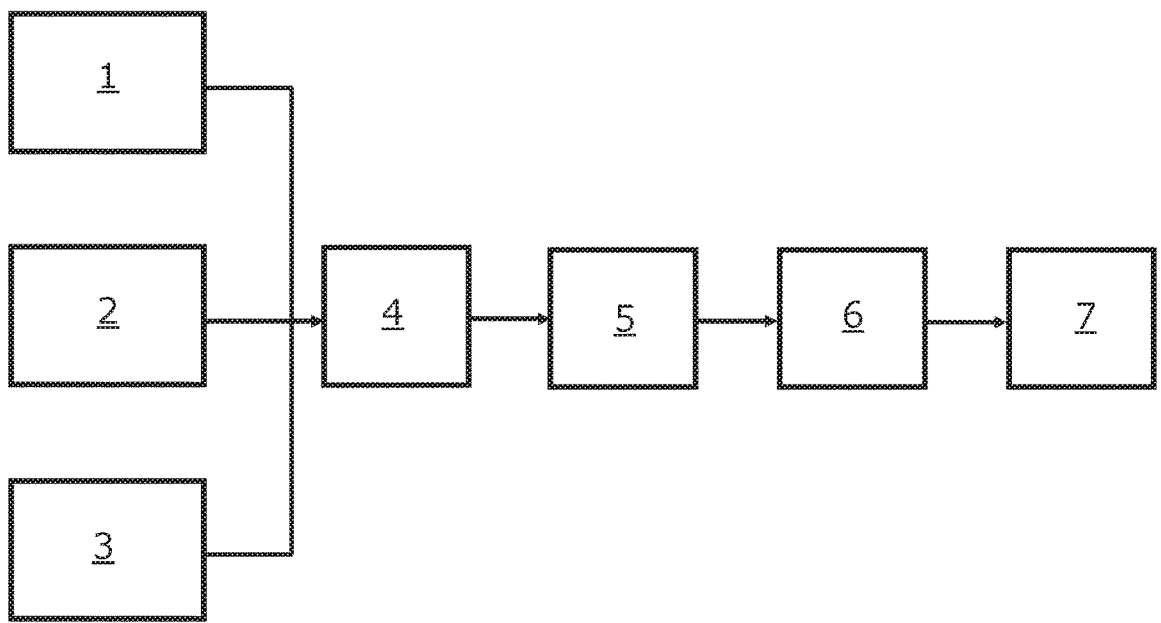
FIG. 1 shows a diagram of a first embodiment of the inventive method.

In block 1 in FIG. 1 a reference temperature is measured by a control unit with at least one temperature sensor. An electric heater is operated in the normal mode if the reference temperature is less than or equal to a critical temperature of a heating element. The electric heater is operated in the protection mode if the reference temperature is greater than the critical temperature. The diagram in FIG. 1 describes the protection mode.

In block 2, the electric voltage across the heating element is measured by the control unit and/or by a first sensor arrangement. In block 3, the electrical current flowing through a heating element is measured by the control unit and/or by a second sensor arrangement. In block 4, the control unit determines the electrical resistance of the heating element by Ohm's law. In block 5, the control unit compares the electrical resistance of the heating element with a maximal electrical resistance value. In block 6, the electrical power supplied to the heating element is reduced by pulse width modulation if the electrical resistance is greater than the maximal electrical resistance value. In block 7, as a result of the pulse width modulation, the output temperature of the electrical heater is controlled and/or regulated.

Figure 2:
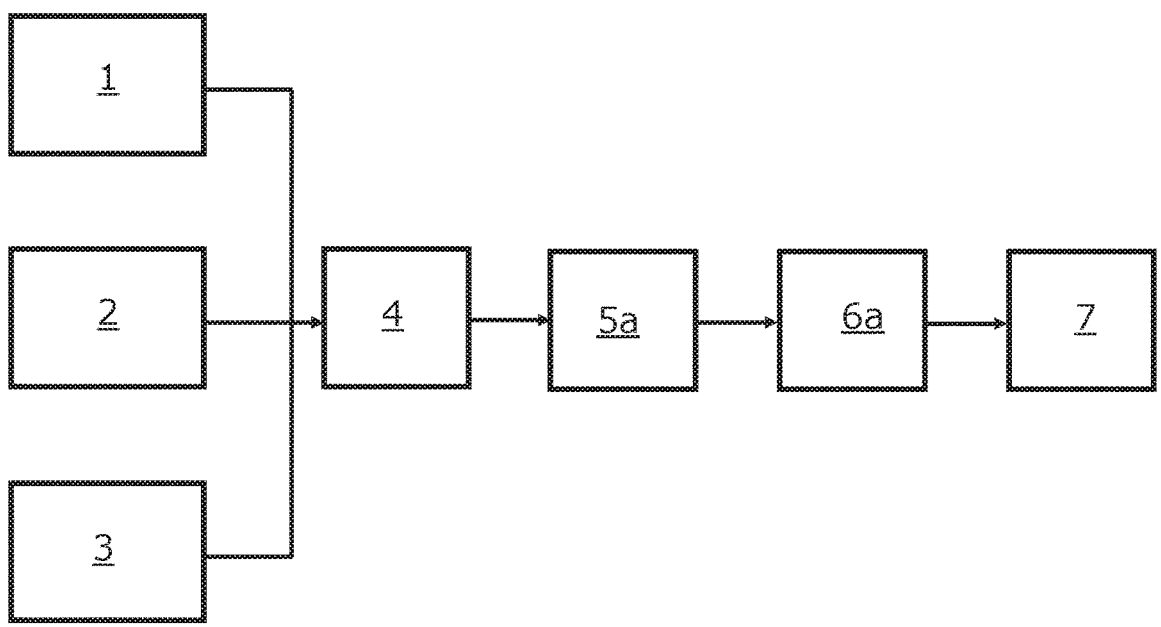
FIG. 2 shows a diagram of a second embodiment of the inventive method.

The diagram in FIG. 2 describes the protection mode of the electrical heater. In contrast to FIG. 1, in block 5a the control unit determines the outlet temperature of the fluid of the electrical heater by means of the reference table and/or transfer function and compares the outlet temperature with a maximal temperature value. In block 6a, the electrical power supplied to the heating element is reduced by pulse width modulation if the outlet temperature is greater than the maximal temperature value.

The invention claimed is:

1. An operating method for an electric heater having at least one control unit with at least one temperature sensor measuring a reference temperature, and at least one heating element having a positive temperature coefficient mode above a critical temperature and a negative temperature coefficient mode below the critical temperature, the operating method comprising:
heating a fluid passing the electric heater to an outlet temperature by the at least one heating element;
operating the electric heater in one of a normal mode, in which the at least one heating element is supplied with at least one of a direct current and a direct voltage, or a protection mode, in which electrical power supplied to the at least one heating element is regulated by pulse width modulation;
wherein the control unit compares the reference temperature with the critical temperature;
wherein the electric heater is operated in the normal mode if the reference temperature is less than or equal to the critical temperature;
wherein the electric heater is operated in the protection mode if the reference temperature is greater than the critical temperature; and
wherein the critical temperature includes a temperature at which the heating element changes from the negative temperature coefficient mode to the positive temperature coefficient mode.

2. The operating method according to claim 1, wherein:
the critical temperature is stored in the control unit;
the control unit triggers the normal mode if the reference temperature is less than or equal to the critical temperature;
the control unit triggers the protection mode if the reference temperature is greater than the critical temperature; and
in the accordance with the critical temperature being exceeded, an electrical resistance of the heating element increases non-linearly with increasing temperature.

3. The operating method according to claim 2, wherein the control unit determines the electrical resistance of the at least one heating element while the electric heater is being operated in the protection mode.

4. The operating method according to claim 3, wherein:
the control unit compares the electrical resistance of the at least one heating element with a maximal electrical resistance value; and
if the electrical resistance is greater than the maximal electrical resistance value, the electrical power supplied to the at least one heating element is reduced by the pulse width modulation.

5. The operating method according to claim 4, wherein the comparison of the electrical resistance of the heating element with the maximal electrical resistance value is performed continuously.

6. The operating method according to claim 1, wherein the control unit determines an electrical resistance of the at least one heating element while the electric heater is being operated in the protection mode.

7. The operating method according to claim 1, including:
measuring voltage across the heating element via a first sensor arrangement;
measuring electrical current flowing through the heating element via a second sensor arrangement;
determining, via the control unit, an electrical resistance of the heating element based on the measured voltage and the measured electrical current;
wherein the control unit compares the electrical resistance of the at least one heating element with a maximal electrical resistance value; and
if the electrical resistance is greater than the maximal electrical resistance value, the electrical power supplied to the at least one heating element is reduced by the pulse width modulation.

8. The operating method according to claim 7, wherein the comparison of the electrical resistance of the heating element with the maximal electrical resistance value is performed repetitively within equidistant time periods.

9. The operating method according to claim 7, wherein the control unit determines the outlet temperature of the fluid via the electrical resistance of the at least one heating element.

10. The operating method according to claim 9, wherein:
the control unit compares the outlet temperature with a maximal temperature value; and
if the outlet temperature is greater than the maximal temperature value, the electrical power supplied to the at least one heating element is reduced by the pulse width modulation.

11. The operating method according to claim 10, wherein the comparison of the outlet temperature with a maximal temperature value is performed continuously.

12. An electric heater comprising:
at least one control unit with at least one temperature sensor measuring a reference temperature; and
at least one heating element having a positive temperature coefficient mode above a critical temperature and a negative temperature coefficient mode below the critical temperature;
wherein the control unit is at least one of formed, configured, and programmed to:
compare the reference temperature with the critical temperature;

operate the electric heater in a normal mode, in which the at least one heating element is supplied with at least one of a direct current and a direct voltage, if the reference temperature is less than or equal to the critical temperature; and operate the electric heater in a protection mode, in which electrical power supplied to the at least one heating element is regulated by pulse width modulation, if the reference temperature is greater than the critical temperature; and wherein the critical temperature includes a temperature at which the heating element changes from the negative temperature coefficient mode to the positive temperature coefficient mode.

13. The electric heater according to claim 12, wherein the electric heater comprises at least one switching element.

14. The electric heater according to claim 13, wherein the switching element is controlled by the control unit.

15. The electric heater according to claim 14, wherein the switching element is electrically conductively connected with the at least one heating element and with at least one power source connection.

16. The electric heater according to claim 13, wherein the switching element is electrically conductively connected with the at least one heating element and with at least one power source connection.

17. An operating method for an electric heater having at least one control unit with at least one temperature sensor measuring a reference temperature, and at least one heating element having a positive temperature coefficient mode above a critical temperature and a negative temperature coefficient mode below the critical temperature, the operating method comprising:

heating a fluid passing the electric heater to an outlet temperature by the at least one heating element;

comparing, by the control unit, the reference temperature with the critical temperature, which is stored in the control unit;

operating the electric heater in a normal mode, in which the at least one heating element is supplied with at least one of a direct current and a direct voltage, if the reference temperature is less than or equal to the critical temperature;

operating the electric heater in a protection mode, in which electrical power supplied to the at least one heating element is regulated by pulse width modulation, if the reference temperature is greater than the critical temperature; and determining an electrical resistance of the at least one heating element while the electric heater is being operated in the protection mode;

wherein the critical temperature includes a temperature at which the heating element changes from the negative temperature coefficient mode to the positive temperature coefficient mode.

18. The operating method according to claim 17, wherein:
the control unit compares the electrical resistance of the at least one heating element with a maximal electrical resistance value; and if the electrical resistance is greater than the maximal electrical resistance value, the electrical power supplied to the at least one heating element is reduced by the pulse width modulation.

19. The operating method according to claim 17, wherein the control unit determines the outlet temperature of the fluid via the electrical resistance of the at least one heating element.

* * * * *